(12) United States Patent
Nevitt et al.

(10) Patent No.: US 9,778,407 B2
(45) Date of Patent: Oct. 3, 2017

(54) LIGHT GUIDE

(71) Applicant: 3M INNOVATIVE PROPERTIES COMPANY, St. Paul, MN (US)

(72) Inventors: Timothy J. Nevitt, Red Wing, MN (US); Charles David Hoyle, Stillwater, MN (US); Michael F. Weber, Shoreview, MN (US); Andrew J. Ouderkirk, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 73 days.

(21) Appl. No.: 14/254,669

(22) Filed: Apr. 16, 2014

(65) Prior Publication Data
US 2015/0301261 A1    Oct. 22, 2015

(51) Int. Cl.
*G02F 1/1335* (2006.01)
*F21V 8/00* (2006.01)

(52) U.S. Cl.
CPC .......... *G02B 6/0036* (2013.01); *G02B 6/0028* (2013.01); *G02F 1/133524* (2013.01)

(58) Field of Classification Search
CPC ................................................ G02F 1/133524
See application file for complete search history.

(56) References Cited

U.S. PATENT DOCUMENTS

| | | | |
|---|---|---|---|
| 7,328,638 B2 | 2/2008 | Gardiner | |
| 7,350,442 B2 | 4/2008 | Ehnes | |
| 7,595,934 B2 | 9/2009 | Lubart | |
| 7,655,283 B2 | 2/2010 | Sherman | |
| 2007/0139576 A1 | 6/2007 | Hunt | |
| 2007/0279727 A1 | 12/2007 | Gandhi | |
| 2007/0279934 A1 | 12/2007 | Kim | |
| 2007/0297736 A1 | 12/2007 | Sherman | |
| 2008/0002432 A1* | 1/2008 | Ueno | G02B 6/0028 362/620 |
| 2008/0106793 A1 | 5/2008 | Olczak | |
| 2009/0034230 A1* | 2/2009 | Lim | G02B 6/0028 362/84 |
| 2009/0303746 A1 | 12/2009 | Wang | |
| 2011/0134623 A1 | 6/2011 | Sherman | |
| 2011/0221998 A1* | 9/2011 | Adachi | G02B 6/0036 349/62 |

(Continued)

FOREIGN PATENT DOCUMENTS

| | | |
|---|---|---|
| WO | WO 00-48037 | 8/2000 |
| WO | WO 2005-080862 | 9/2005 |

(Continued)

OTHER PUBLICATIONS

Funamoto, "LED backlight system with double prism pattern", Journal of the Society for Information Display, 2006, vol. 14, No. 11, pp. 1045-1051.

(Continued)

*Primary Examiner* — Edmond Lau
(74) *Attorney, Agent, or Firm* — Clifton F. Richardson

(57) ABSTRACT

A light guide having a first major surface, a second major surface, an input edge and an opposing edge, where at least one of the first major surface and the second major surface includes a plurality of multiplets. Each multiplet includes two or more extraction features having an indented geometry.

22 Claims, 11 Drawing Sheets

(56) References Cited

U.S. PATENT DOCUMENTS

| | | | |
|---|---|---|---|
| 2011/0292318 A1* | 12/2011 | Nakamoto | G02B 6/003 349/62 |
| 2012/0038990 A1 | 2/2012 | Hao | |
| 2012/0235891 A1* | 9/2012 | Nishitani | G02B 3/0056 345/102 |
| 2012/0294037 A1* | 11/2012 | Holman | F21V 5/02 362/609 |
| 2013/0063980 A1 | 3/2013 | Ender | |
| 2013/0114297 A1* | 5/2013 | Kim | G02B 6/0036 362/611 |
| 2013/0163222 A1* | 6/2013 | Ye | F21V 9/14 362/19 |
| 2013/0201427 A1* | 8/2013 | Chen | G02B 27/2214 349/65 |
| 2013/0201721 A1* | 8/2013 | Tsai | G02B 6/0036 362/609 |
| 2013/0250614 A1 | 9/2013 | Thompson | |

FOREIGN PATENT DOCUMENTS

| | | |
|---|---|---|
| WO | WO 2013-122728 | 8/2013 |
| WO | WO 2014-011731 | 1/2014 |
| WO | WO 2014-089289 | 6/2014 |

OTHER PUBLICATIONS

Gegel, "Short-Fiber Cast Aluminum MMCs: Properties & Value", Solidification Processing of Metal Matrix Composites Rohatgi Honorary Symposium, 239-248 (2006).

Lasagni, "Interpenetrating Hybrid Reinforcement in $Al_2O_3$ Short Fiber Performs Infiltrated by Al—Si Alloys", Metallurgical and Materials Transactions A, Jun. 2008, vol. 39A, pp. 1466-1474.

\* cited by examiner

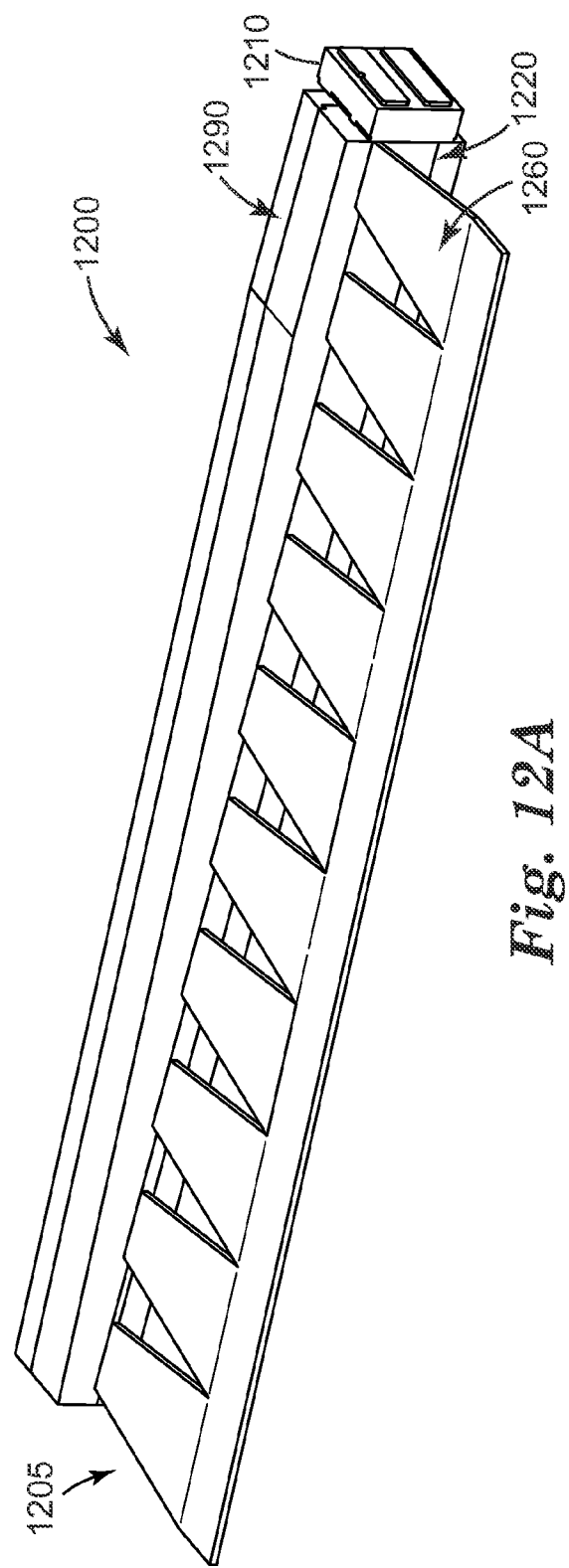

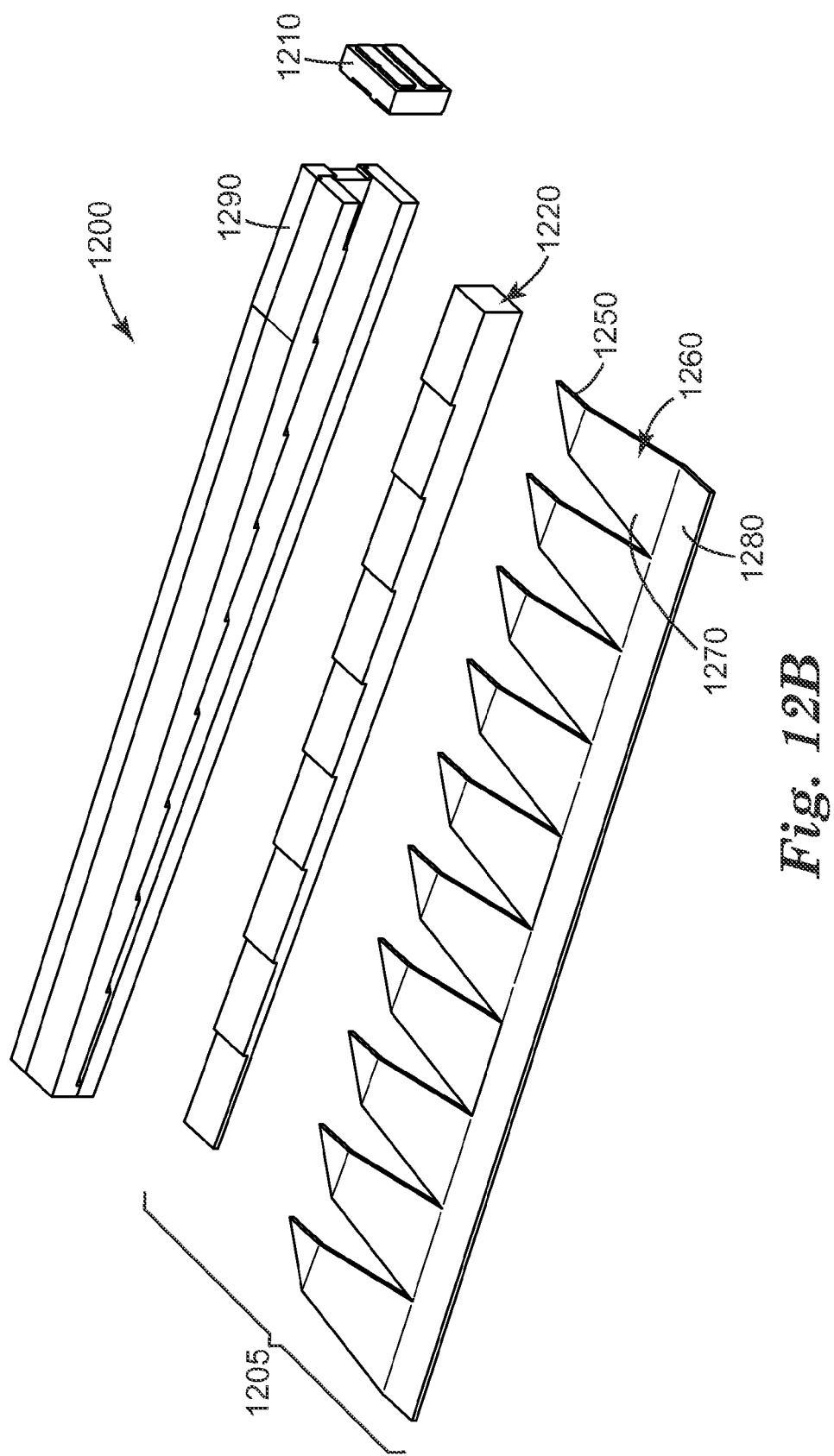

LIGHT GUIDE

BACKGROUND

In a conventional Liquid Crystal Display (LCD), a backlight provides light that is input into an LCD panel. The backlight includes a light source and a light guide which typically includes some type of extractor that extracts light from the light guide. The extracted light typically does not have a desired angular distribution and brightness enhancing films are included in the display to recycle light in order to provide an improved angular distribution. A large number of reflections may occur from such recycling and there is associated radiant energy loss. A need exists for a light guide that can provide reduced recycling and an improved efficiency.

SUMMARY

In some aspects, the present description provides a light guide that includes a first major surface, a second major surface, an input edge and an opposing edge, where at least one of the first major surface and the second major surface includes a plurality of multiplets. Each multiplet includes two or more extraction features and each extraction feature has an indented geometry.

In some aspects, a lighting panel is provided that includes the light guide and a light source disposed to inject light into the light guide.

In some aspects, a display that includes the lighting panel is provided.

BRIEF DESCRIPTION OF THE DRAWINGS

FIG. 12A is an isometric view of a light source;

FIG. 12B is an exploded view of the light source of FIG. 11A;

DETAILED DESCRIPTION

In a conventional Liquid Crystal Display (LCD), a backlight provides light that is input into an LCD panel. The backlight includes a light source and a light guide. Typically, a scattering back reflector is provided behind the light guide and a film stack which includes brightness enhancing films (BEF) is placed between the light guide and the LCD panel to recycle light output by the backlight to give it an improved angular distribution. A reflective polarizer is also typically included in the film stack between the light guide and the LCD panel for polarization recycling.

The present description provides light guides capable of providing light output with an angular distribution such that only a minimum amount of light recycling is needed. In some embodiments, only polarization recycling is needed. This provides improved efficiency over conventional designs since there is some loss associated with a large number of reflections. The light guides also provide improved view angle and contrast compared to conventional LCD designs.

Additional applications of the light guides and lighting panels described herein are described in commonly assigned U.S. patent application Ser. No. 14/254,678, entitled "Laminated Display Unit" and filed on an even date herewith, which is hereby incorporated herein by reference in its entirety.

As used herein, a multiplet of extraction features refers to two or more extraction features where the space between extraction features is smaller than the width of the extraction features and is smaller than the space between neighboring multiplets. In some embodiments, the extraction features have a width that varies along the length of the extraction features and a gap between the extraction features in a multiplet that varies along the length of the multiplet. In these cases, a multiplet of extraction features is to be understood to mean two or more extraction features where the smallest space between extraction features is smaller than the maximum width of the extraction features and is smaller than the space between neighboring multiplets. In some embodiments, the minimum space between extraction features within a multiplet is less than 0.5 or less than 0.25 or less than 0.1 times the maximum width of an extraction feature.

Figure 1:
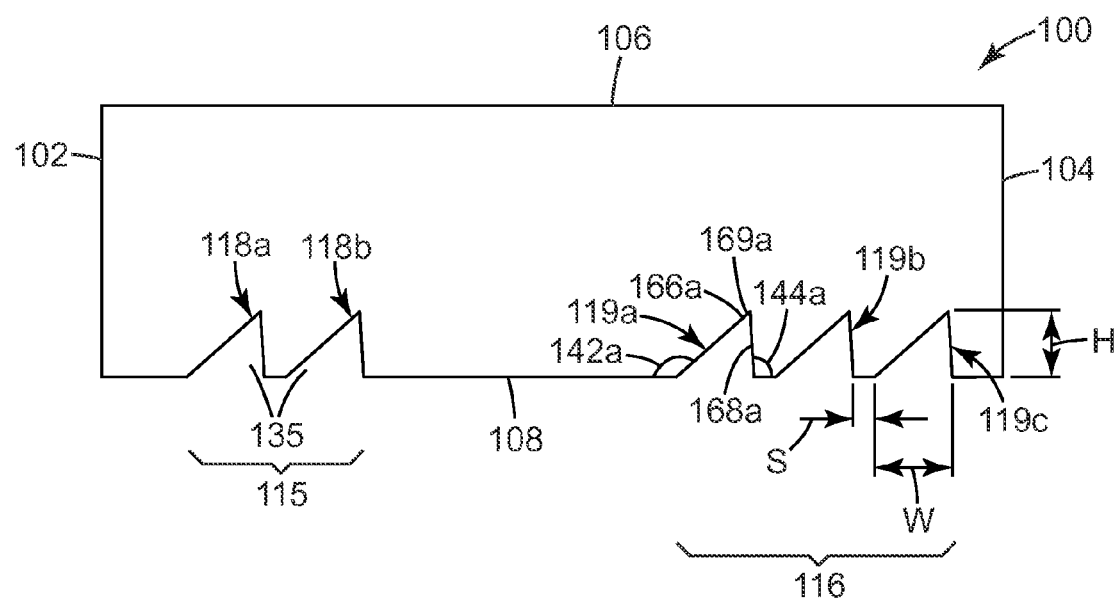
FIG. 1 is a schematic cross-section view of a light guide having multiplet extraction features.

FIG. 1 shows light guide 100 having input edge 102, opposing edge 104, first major surface 106 and second major surface 108. Second major surface 108 includes multiplets 115 and 116. Multiplet 115 includes two extraction features 118a and 118b and multiplet 116 includes three extraction features 119a, 119b and 119c. Extraction feature 119c has a height H, a width W, and there is a spacing S, which is smaller than W, between extraction features 119b and 119c. In some embodiments, the thickness or height, H, of the extraction features may be in a range of about 1 micron to about 30 microns or in a range of about 2 microns to about 20 microns or in a range of about 5 microns to about 15 microns. In some embodiments, the width, W, of the extraction features may be in a range of about 1 micron to about 30 microns or in a range of about 2 microns to about 20 microns or in a range of about 5 microns to about 15 microns.

Extraction features 118a and 118b have an indented geometry and form air pockets 135 between the interior of the extraction features and second major surface 108. As used herein, indented geometry refers to the geometry of features that extend from a surface of a material toward the interior of the material (for example, extraction feature 118a of FIG. 1).

Extraction feature 119a has first surface 166a facing input edge 102, second surface 168a facing opposing edge 104 and an apex 169a. First surface 166a makes a first angle 142a with second major surface 108 on the side of first surface 166a facing input edge 102 and second surface 168a makes a second angle 144a with second major surface 108 on the side of second surface 168a facing opposing edge 104. In some embodiments, first angle 142a is in a range of about 110 degrees to about 150 degrees or in a range of about 120 degrees to about 145 degrees. First surface 166a may have a curvature so that first angle 142a varies from a lower value near the base at second major surface 108 to a higher value near apex 169a. For example, first angle 142a may be in a range of about 120 to about 130 degrees near second major surface 108 and in a range of about 135 degrees to about 145 degrees near apex 169a. In some embodiments, second angle 144a may be in a range of about 90 to about 120 degrees or in a range of about 90 to about 110 degrees. In some embodiments, each extraction feature has an asymmetric shape as illustrated in FIG. 1.

First surface 166a defines a first slope with respect to a direction extending from input edge 102 to opposing edge 104 along second major surface 108. Second surface 168a defines a second slope with respect to a direction extending from input edge 102 to opposing edge 104 along second major surface 108. In some embodiments, the magnitude of the second slope is larger than the magnitude of the first slope. The first slope may be in a range of about 0.5 to about 1.5 and may vary from a lower value near the base at second major surface 108 to a higher value near apex 169a. The second slope may be in a range of about −1.5 to about −150.

Light guide 100 can be made by hot pressing a polymer sheet between a flat and smooth plate, such as a polished chrome plate, and a structured stamping tool, such as a structured nickel stamping tool. Suitable polymers include PMMA or other acrylic polymers, cyclic olefin polymer (COP), such as ZEONOR 1420R (Zeon Chemicals, Louisville, Ky.), polycarbonate, CR-39 (allyl diglycol carbonate), and polystyrene. Suitable stamping tools can be prepared by machining, such as by single point diamond machining. Exemplary diamond turning systems and methods can include and utilize a fast tool servo (FTS) as described in, for example, PCT Published Application No. WO 00/48037 (Campbell et al.), and U.S. Pat. No. 7,350,442 (Ehnes et al.) and U.S. Pat. No. 7,328,638 (Gardiner et al.).

The approaches described herein provides for extraction features that are easier to fabricate than approaches which use a combination of a positive (apex facing out with respect to the light guide) and a negative (apex facing in with respect to the light guide) shaped prisms. In contrast to this, preferred embodiments of the present description provide light guides where all extraction features have an indented geometry. In some embodiments, the indented extraction features have an apex pointing inward toward the bulk of the light guide. The molds needed for shaping a polymeric light guide with extraction features are much easier to fabricate if all extraction features have an indented geometry.

In some embodiments each extraction feature in a multiplet are substantially identical, but the geometries of the multiplets vary from the input edge 102 to the opposing edge 104. For example extraction feature 118a may be substantially identical to extraction feature 118b, but extraction feature 118a may differ from extraction feature 119a. In some embodiments, all multiplets are doublets having two extraction features, in other embodiments all multiplets are triplets having three extraction features. In still other embodiments, a combination of doublets and triplets may be used or multiplets with four or more extraction features may be used.

Figure 2:
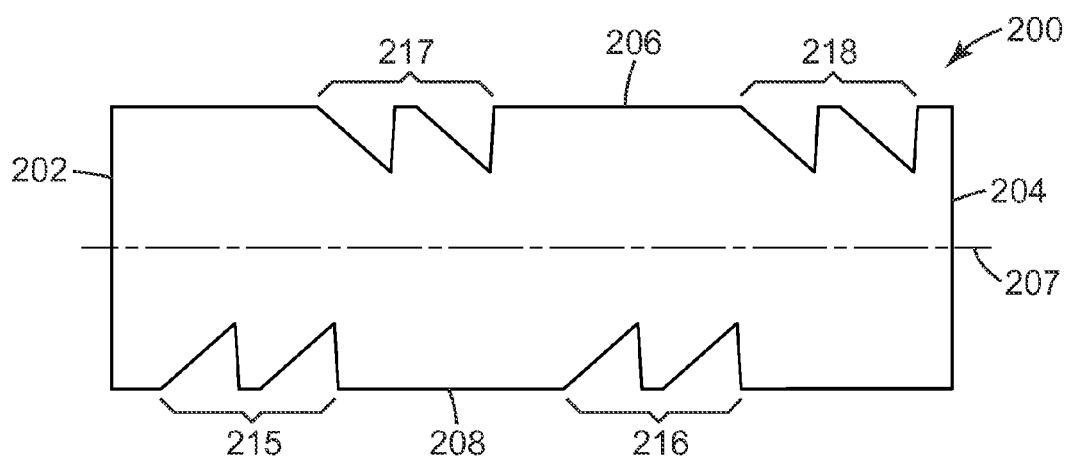
FIG. 2 is a schematic cross-section view of a light guide having multiplet extraction features.

FIG. 2 shows light guide 200 having input edge 202, opposing edge 204, first major surface 206 and second major surface 208. Second major surface 208 includes multiplets 215 and 216, and first major surface 206 include multiplets 217 and 218. Also shown in FIG. 2 is the center plane 207 of light guide 200. Light guide 200 can be used with an LCD display positioned above first major surface 206 and a mirror below second major surface 208. Light input into input edge 202 is redirected by multiplets 215 and 216 towards the LCD panel and light input into input edge 202 is redirected by multiplets 217 and 218 towards the mirror which then reflects the light towards the LCD panel. In some embodiments, multiplets are included in both major surfaces of the light guide as shown in FIG. 2. In other embodiments, multiplets are included in only the first major surface 206 or only in the second major surface 208.

The extraction features may have geometries that vary from the input edge of the light guide to the opposing edge. For example, an extraction feature may have a geometry with a central region having a relatively large height, H, that is nearly constant in the central region but tapers to zero in tapered regions near the edges of the extraction feature. The width, W, may also be approximately constant in the central region and taper to zero at the edges of the extraction feature. Multiplets near the input edge to the light guide, may have a small central region and large tapered regions so that a relatively small amount of incident light is extracted, while multiplets near the opposing edge may have a large central region and small tapered regions so that a relatively large amount of incident light is extracted. Such an arrangement can be used to generate a substantially uniform illumination since the light intensity near the input edge is substantially higher than the light intensity near the opposing edge.

Figure 3A:
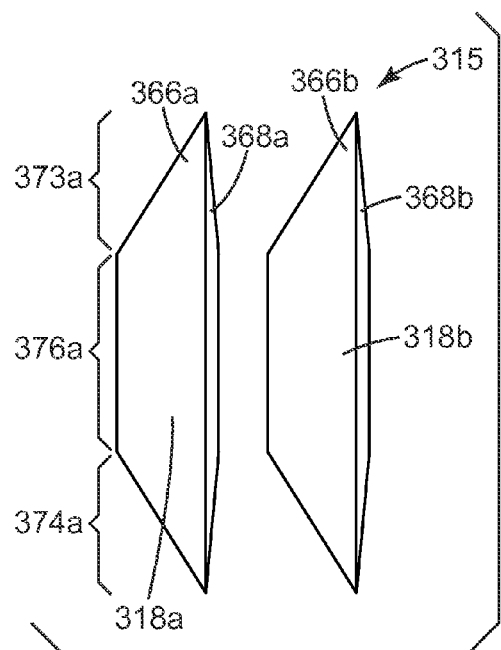
FIG. 3A is a top view of a multiplet.
Figure 3B:
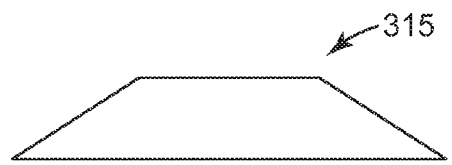
FIG. 3B is a side view of the multiplet of FIG. 3A.
Figure 4A:
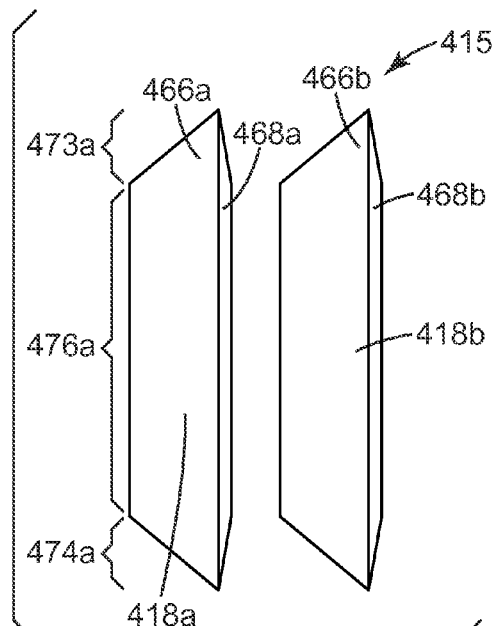
FIG. 4A is a top view of a multiplet.
Figure 5A:
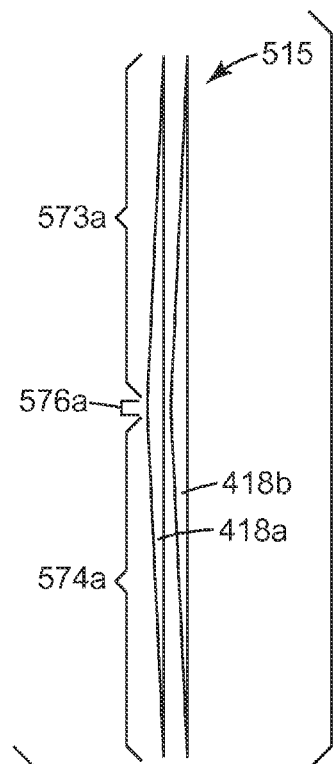
FIG. 5A is a top view of a multiplet.
Figure 4B:
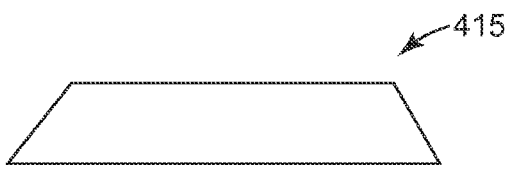
FIG. 4B is a side view of the multiplet of FIG. 4A.
Figure 5B:
FIG. 5B is a side view of the multiplet of FIG. 5A.

This is illustrated in FIGS. 3A-5B. FIGS. 3A and 3B show a top view and a side view of multiplet 315, respectively, which in this case is a doublet having two extraction features 318a and 318b. Extraction feature 318a includes first surface 366a and second surface 368a. Similarly, extraction feature 318b includes first surface 366b and second surface 368b. Extraction feature 318a includes a first tapered region 373a, a second tapered region 374a and a central region 376a. In this case, central region 376a is comparable in size to first and second tapered regions 373a and 374a. Extraction feature 318b includes similar regions. Multiplet 315 may be used in a center region of a light guide between an input edge and the opposing edge. FIGS. 4A and 4B show a top view and a side view of multiplet 415 which includes extraction features 418a and 418b. Extraction feature 418a includes first surface 466a and second surface 468a. Similarly, extraction feature 418b includes first surface 466b and second surface 468b. Extraction feature 418a includes a first tapered region 473a, a second tapered region 474a and a central region 476a. In this case, central region 476a is significantly larger than first and second tapered regions 473a and 474a. Extraction feature 418b includes similar regions. Multiplet 415 may be used in a region of a light guide near an edge opposite the input edge. FIG. 5A shows a top view of multiplet 515, which includes extraction features 518a and 518b. Extraction feature 518a includes a first tapered region 573a, a second tapered region 574a and a central region 576a. In this case, central region 576a is much smaller than first and second tapered regions 573a and 574a. Extraction feature 518b includes similar regions. Multiplet 515 may be used in a region of a light guide near an input edge. FIG. 5B shows a side view of multiplet 515.

Various geometric features of the multiplets may vary from an input edge of a light guide to the opposing edge in order to produce a uniform light output. These features include the shape of the extraction features, for example the length of a central region relative to the length of tapered regions, the length of the extraction features, one or more spacings between extraction features, and combinations thereof.

Figure 6A:
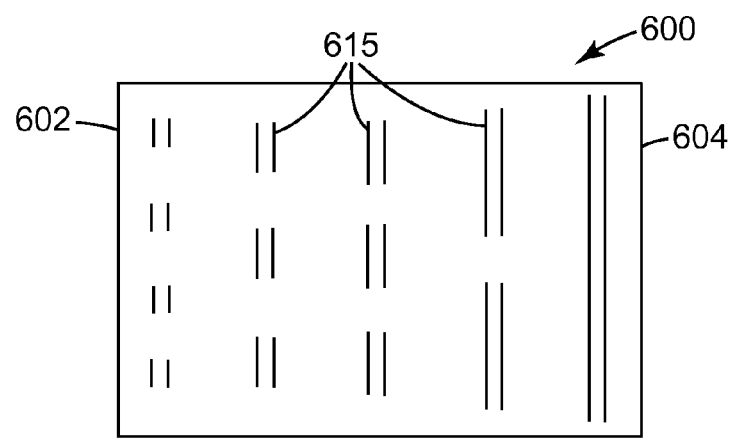
FIG. 6A is a schematic top view of a light guide having a multiplet extraction features.
Figure 6B:
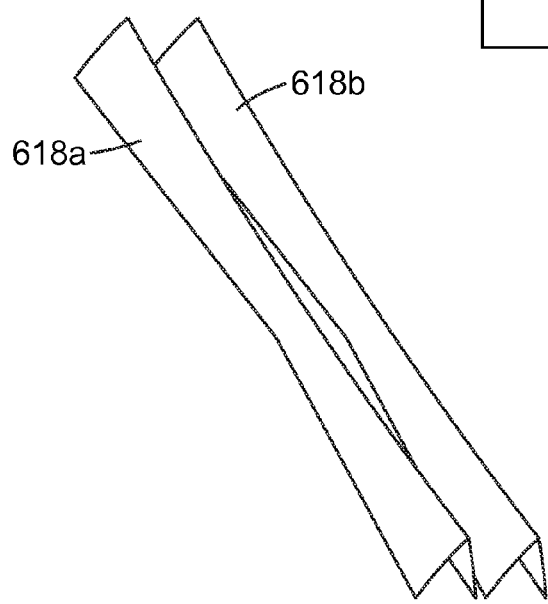
FIG. 6B is a perspective view of a portion of a multiplet of FIG. 6A.

In some embodiments, the length of the multiplets vary from an input edge of a light guide to the opposing edge in order to produce a uniform light output. This is illustrated in FIG. 6A, which shows light guide 600 having input edge 602, opposing edge 604 and a plurality of multiplets 615. The extraction features of multiplets 615 have a length that increases from input edge 602 to opposing edge 604. In some embodiments, neighboring extraction features along the length direction may have a shape given by merging two shorter extraction features to give a longer extraction feature having a narrow region in the center from the merger of two tapered regions. This is illustrated in FIG. 6B which shows a portion of a multiplet consisting of extraction feature 618a and 618b in the merged region.

Figure 6C:
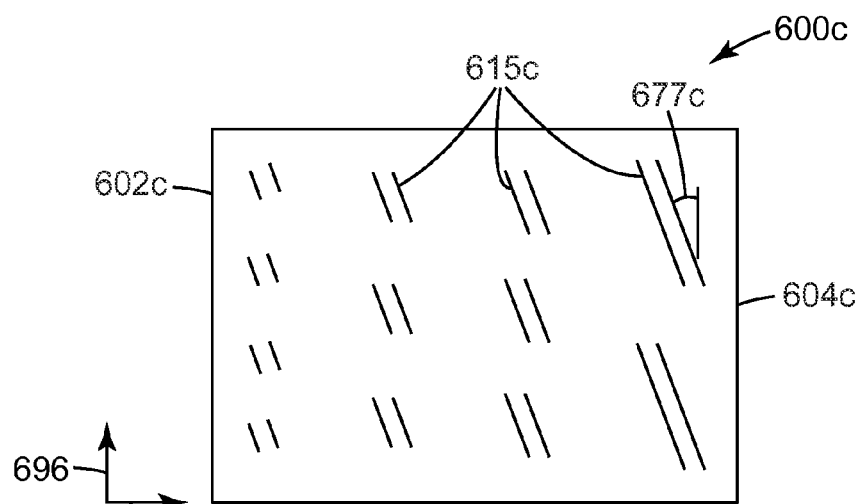
FIG. 6C is a schematic top view of a light guide having a multiplet extraction features.

In some embodiments, the extraction features are skewed or tilted so that they are not orthogonal to the light propagation direction. This is illustrated in FIG. 6C, which shows light guide 600c having input edge 602c, opposing edge 604c and a plurality of multiplets 615c. The light guide has a propagation direction 693 directed from input edge 602 to opposing edge 604 and an orthogonal direction 696. Multiplets 615c extend in a direction at an angle 677 from the in-plane direction 696 orthogonal to the propagation direction 693. In some embodiments, the extraction features extend in a direction at an angle 677 from about 0 degrees to about 45 degrees from an in-plane direction 696 orthogonal to a direction 693 from the input edge 602c to the opposing edge 604c. Tilting the extraction features can allow the output of the light guide to be at least partially collimated in a direction that is not normal to the display surface. This may be useful for certain types of displays such as a watch display.

Figure 7:
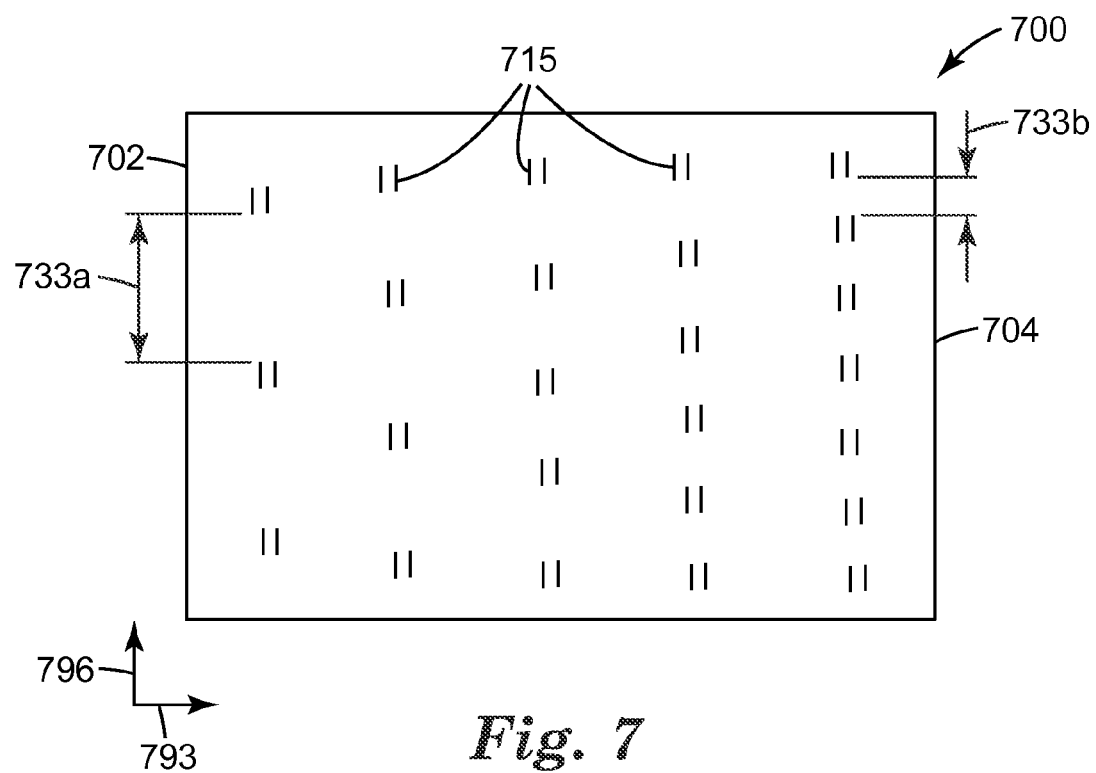
FIG. 7 is a schematic top view of a light guide having a multiplet extraction features.
Figure 8:
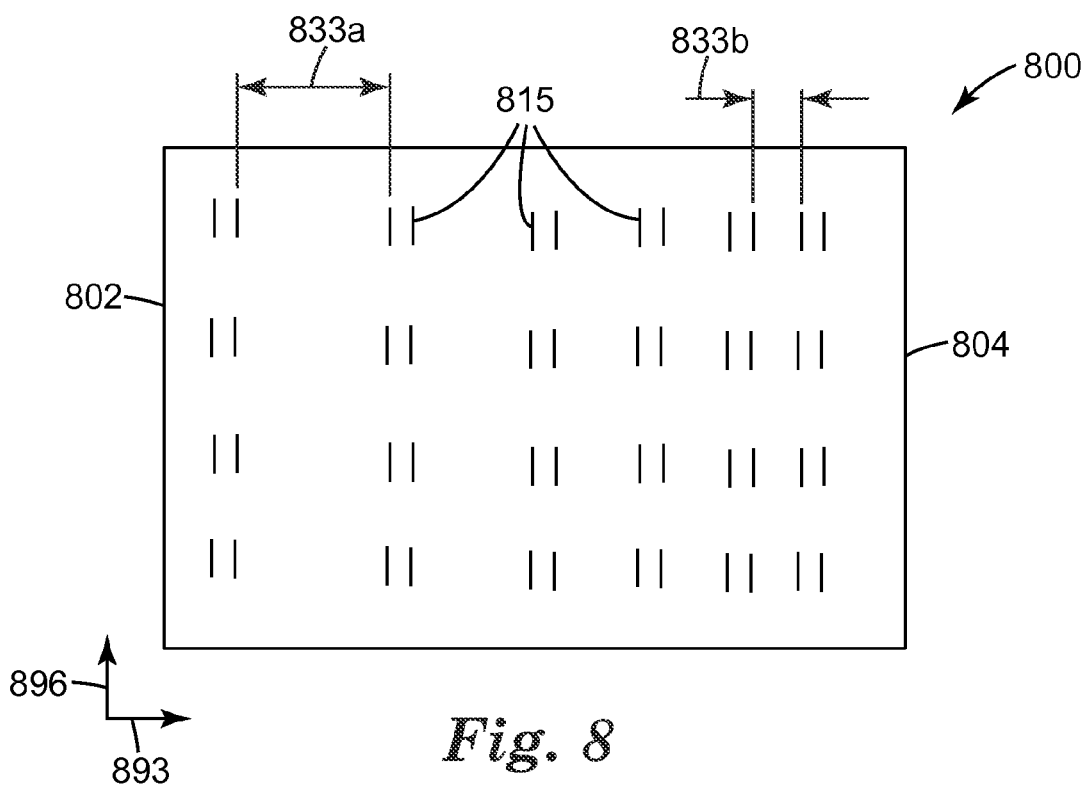
FIG. 8 is a schematic top view of a light guide having a multiplet extraction features.

In some embodiments, the spacing between the multiplets vary from an input edge of a light guide to the opposing edge in order to produce a uniform light output. The spacing may vary in the light propagation direction, or the spacing may vary in the direction orthogonal to the light propagation direction, or the spacing may vary in both directions. This is schematically illustrated in FIGS. 7 and 8. FIG. 7 shows light guide 700 having input edge 702, opposing edge 704 and a plurality of multiplets 715. The light guide has a propagation direction 793 directed from input edge 702 to opposing edge 704 and an orthogonal direction 796. The spacing between adjacent multiplets 715 in orthogonal direction 796 decreases from input edge 702 to opposing edge 704. For example, spacing 733a near input edge 702 is larger than spacing 733b near opposing edge 704. FIG. 8 shows light guide 800 having input edge 802, opposing edge 804 and a plurality of multiplets 815. The light guide has a propagation direction 893 directed from input edge 802 to opposing edge 804 and an orthogonal direction 896. The spacing between adjacent multiplets 815 in propagation direction 893 decreases from input edge 802 to opposing edge 804. For example, spacing 833a near input edge 802 is larger than spacing 833b near opposing edge 804.

Figure 9A:
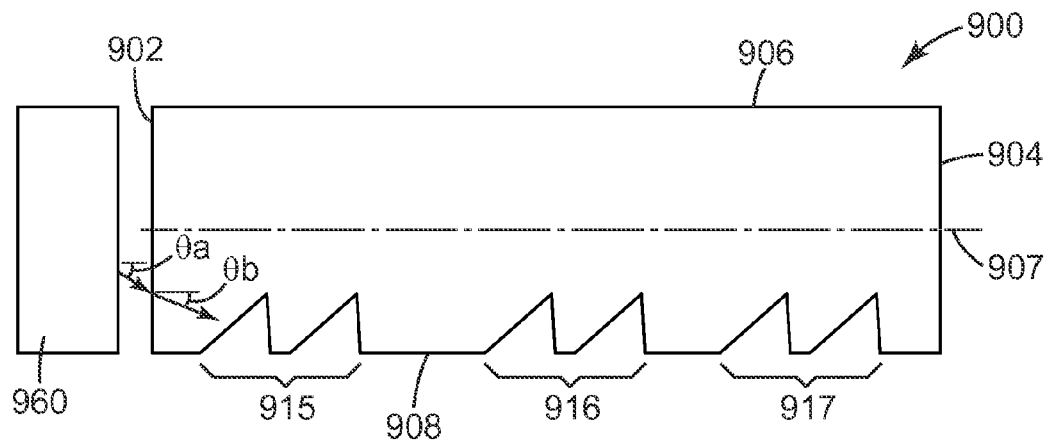
FIG. 9A is a schematic cross-section view of a lighting panel.

FIG. 9A shows a lighting panel, which may be, for example, a backlight or a front light, including light guide 900 and light source 960. Light guide 900 includes input edge 902, opposing edge 904, first major surface 906 and second major surface 908. Second major surface 908 includes multiplets 915, 916 and 917. Light source 960 is disposed to inject light into input edge 902. Light guide 900 includes center plane 907. A light 970 from light source 960 has an angle $\theta_a$ in air relative to a plane parallel to center plane 907. After light 970 enters light guide 900, it has an angle $\theta_b$ in the medium of light guide 900 relative to a plane parallel to center plane 907.

Figure 9B:
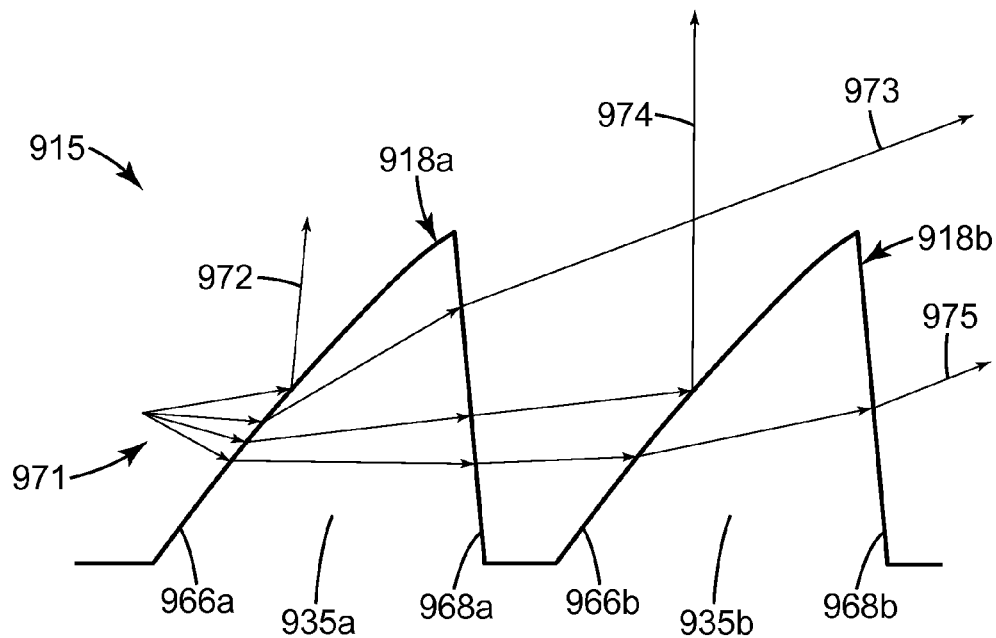
FIG. 9B is a schematic cross-section view of a light beam incident on a multiplet of the lighting panel of FIG. 9A.

FIG. 9B provides a magnified view of multiplet 915 which includes extraction features 918a and 918b. Extraction features 918a and 918b contain air pockets 935a and 935b, respectively. Extraction feature 918a includes first surface 966a and second surface 968a. Similarly, extraction feature 918b includes first surface 966b and second surface 968b. Light beam 971 is incident on multiplet 915. Light beam 971 includes light rays 972, 973, 974 and 975. Light ray 972 is incident on first surface 966a of extraction feature 918a at an angle of incidence relative to a normal to first surface 966a that is above the critical angle where TIR occurs. Light ray 972 reflects off of first surface 966a via TIR and exits light guide 900 in a direction that is close to normal to first major surface 906.

Light ray 973 is incident on first surface 966a at an incidence angle below the critical angle for TIR and light ray 973 is transmitted through surface 966a into air pocket 935a. It is then transmitted through second surface 968a back into light guide 900. Light ray 973 misses extraction feature 918b and is incident on first major surface 906 of light guide 900 at an incident angle above the critical angle for TIR. Light ray 973 is reflected from first major surface 906 and is subsequently extracted from the light guide when it is interacts with another multiplet (for example, multiplet 916 or 917) in light guide 900.

Light ray 974 is incident on first surface 966a at an incidence angle below the critical angle for TIR and light ray 974 is transmitted through first surface 966a into air pocket 935a. It is then transmitted through second surface 968a back into light guide 900 where it is incident of first surface 966b of second extraction feature 918b at an incidence angle above the critical angle for TIR. Light ray 974 reflects from first surface 966b and exits light guide 900 in a direction approximately normal to first major surface 906 of light guide 900.

Light ray 975 is incident on first surface 966a at an incidence angle below the critical angle for TIR and light ray 975 is transmitted through surface 966a into air pocket 935a. It is then transmitted through second surface 968a into light guide 900. Light ray 975 is then incident on first surface 966b of extraction feature 918b at an incidence angle below the critical angle for TIR. Light ray 975 is transmitted through first surface 966b into air pocket 935b. It is then incident on second surface 968b and re-enters light guide 900 where it is incident on first major surface 906 at an incident angle above the critical angle for TIR. Light ray 975 is reflected from first major surface 906 and is subsequently extracted from the light guide when it is interacts with another multiplet in light guide 900.

First surface 966*a* has a curved shape that curves away from the input edge. In some embodiments, first surface 966*a* may include one or more flat or curved portions.

Figure 10:
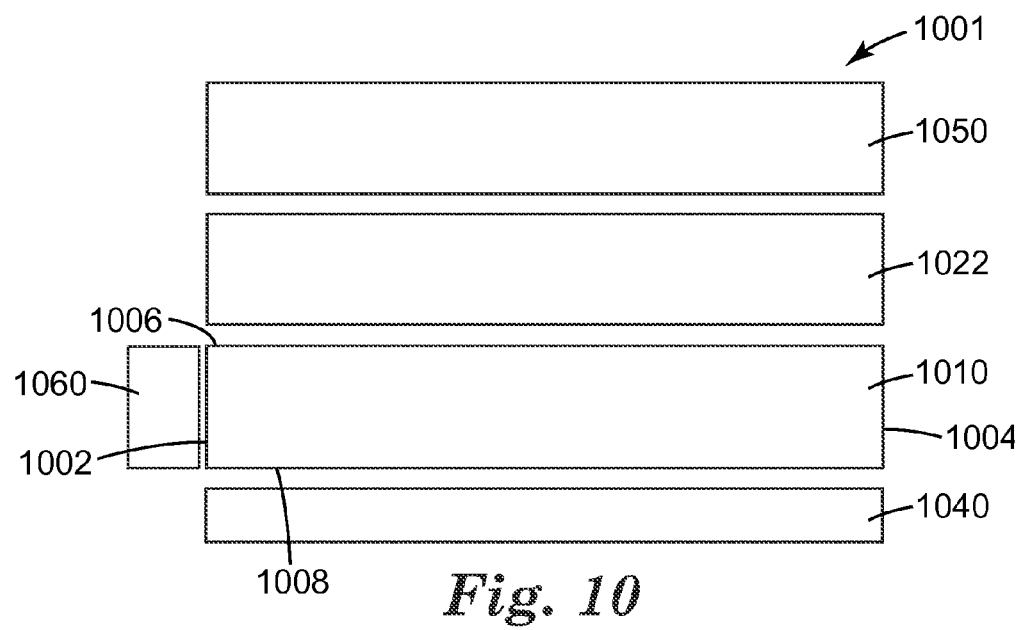
FIG. 10 is a schematic cross-section view of a display.

FIG. 10 shows a display 1001 that includes a light guide 1010 having input edge 1002, opposing edge 1004, first major surface 1006 and second major surface 1008. Display 1001 also includes reflector 1040, optical film 1022, LCD panel 1050 and light source 1060. In the embodiment illustrated in FIG. 10, reflector 1040 is disposed adjacent second major surface 1008 with an air gap between light guide 1010 and reflector 1040 and optical film 1022 is disposed adjacent first major surface 1006 with an air gap between light guide 1010 and optical film 1022. Light source 1060 injects light into input edge 1002 of light guide 1010.

Optical film 1022 may be a single film or may be a film stack that includes one or more optical films. In some embodiments, optical film 1022 is a reflective polarizer, such as DBEF, a multi-layer polymeric optical film available from 3M Company, St. Paul, Minn. In some embodiments, optical film 1022 is reflective polarizer attached to an absorbing polarizer with the absorbing polarizer opposite light guide 1010. In some embodiments, BEF prism films are not included in display 1001. Since the multiplet extactors provide collimation in the propagation direction (the direction from input edge 1002 to opposing edge 1004), BEF films are not needed to provide collimation in this direction. In some embodiments, a single BEF film is included with prisms oriented to provide collimation in the width direction (the in-plane direction orthogonal to the propagation direction). In other embodiments, a collimated or partially collimated light source is used and no BEF films are needed to provide a collimated output. In some embodiments, the light injected into the light guide is at least partially collimated such that the light has a half angle-width at half maximum power no more than about 30 degrees, or no more than about 25 degrees, or no more than about 20 degrees, in the light guide relative to a plane substantially parallel to a center plane of the light guide.

Light source 1060 and light guide 1010 together form a lighting panel for display 1001. Such lighting panels may also be useful in lighting application other than displays. Unless otherwise indicated, references to "lighting panels" or "backlights" are also intended to apply to other extended area lighting devices that provide nominally uniform illumination in their intended application. Such other devices may provide either polarized or unpolarized outputs. Examples include light boxes, signs, channel letters, and general illumination devices designed for indoor (e.g. home or office) or outdoor use, sometimes referred to as "luminaires."

In embodiments where all extractors are on the same side of the light guide, the reflector can be omitted. In some embodiments, light source 1060 and light guide 1010 together form a transparent luminaire or lighting panel that can be used as a front light in front-lit displays. For example, such a front light can be used in e-readers and may be placed under an easy-clean glass so that fingerprints do not cause light extraction. In some embodiments, light guide 1010 may be placed in front (output side) of a reflective display panel, such an electrophoretic ink panel or a reflective LCD panel, and a touch panel may be placed adjacent the reflective display panel opposite the light guide. In some aspects of the present description, the transparent luminaire provided by light guide 1010 may be attached to or between glass panels and may be used as or with a window such as a skylight.

In some embodiments, light source 1060 provides substantially Lambertian light input into light guide 1010. In other embodiments, light source 1060 provides light that is at least partially collimated in one or two directions. In some embodiments, collimation is provided by single or multi-faceted tapered collimating structures included in light source 1060. Such collimating structures include linear, segmented linear, parabolic, compound parabolic or other structures. The structures may collimate or partially collimate in one direction or in two directions.

Figure 11A:
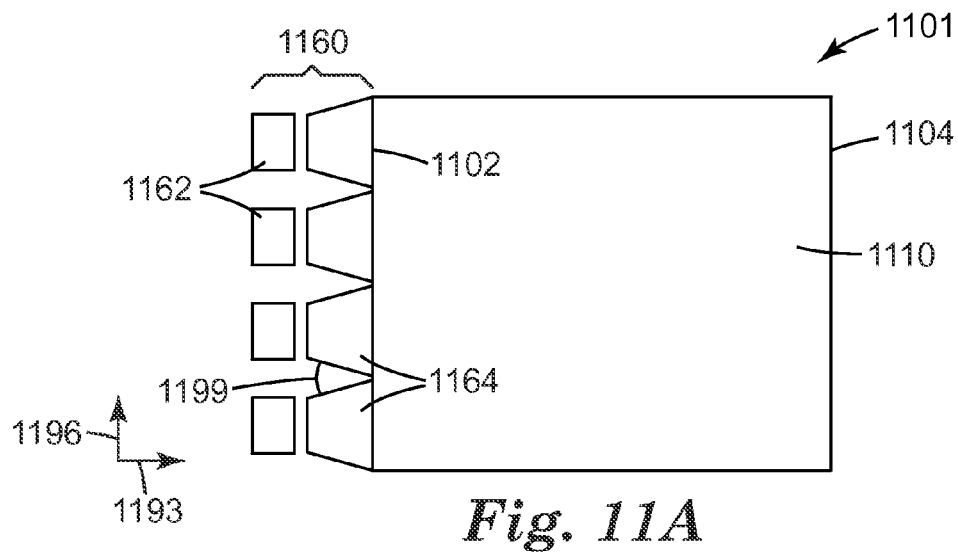
FIG. 11A is a schematic top view of a lighting panel.
Figure 11B:
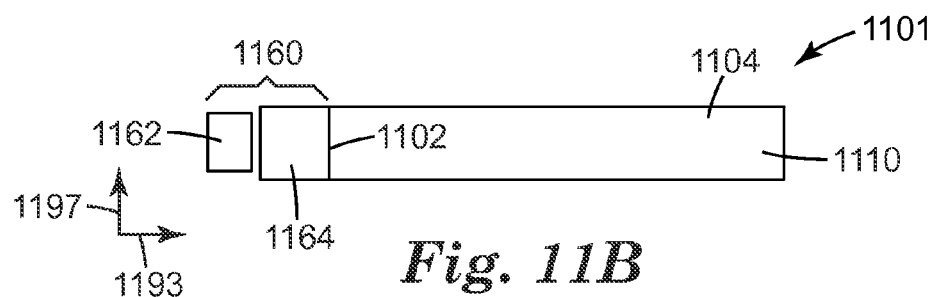
FIG. 11B is a schematic side view of a lighting panel.

FIGS. 11A-11B show lighting panel 1101 including light guide 1110 having input edge 1102 and opposing edge 1104 and light source 1160. Light source 1160 is disposed to inject light into input edge 1102. Light source 1160 includes light emitting components 1162 and light collimating elements 1164. Light emitting components 1162 may be light emitting diodes (LEDs). Many LEDs, such as LEDs with phosphor coatings, produce substantially Lambertian light. Collimating elements 1164 may be used to provide collimation for light output from LEDs. The light guide 1110 has a propagation direction 1193 from input edge 1102 to opposing edge 1104, a width direction 1196 (in-plane direction orthogonal to propagation direction 1193), and a height direction 1197. In the embodiment illustrated in FIGS. 11A-11B, light collimating elements are linear tapers that taper in width direction 1196 as shown in FIG. 11A but are substantially flat in height direction 1197 as shown in FIG. 11B. The wedge sides have total angular separation 1199. Light emitting components 1162 may be a plurality of light emitting diodes. The light collimating elements 1164 may have an aspect ratio of 2:1 or higher, for example 3:1. The light collimating elements 1164 may be attached to the light guide 1110 or may be separate.

As used herein, light from a first light source is said to be at least partially collimated in one direction if the amount of light having an angle of greater than 30 degrees relative to a plane is less than the amount of light having an angle of greater than 30 degrees relative to the plane when the light source is replaced by a Lambertian light source having the same intensity and position as the first light source. The plane may be the center plane of a light guide and the light may be partially collimated in one direction by passing the light through collimating elements 1164, which are tapered in one direction and may have an aspect ratio of 2:1 or higher.

Figure 17A:
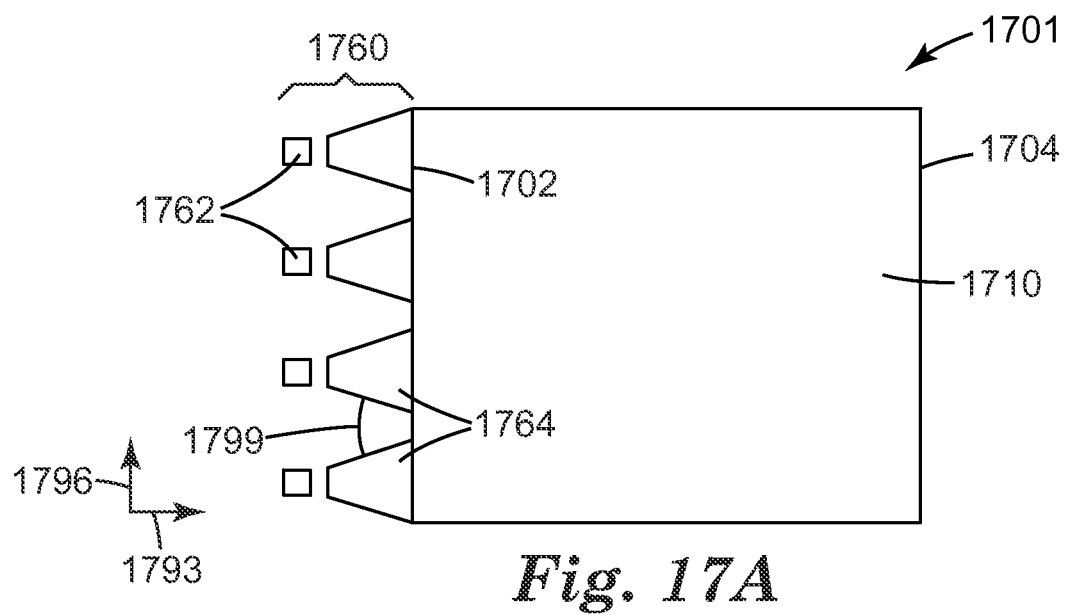
FIG. 17A is a schematic top view of a lighting panel.
Figure 17B:
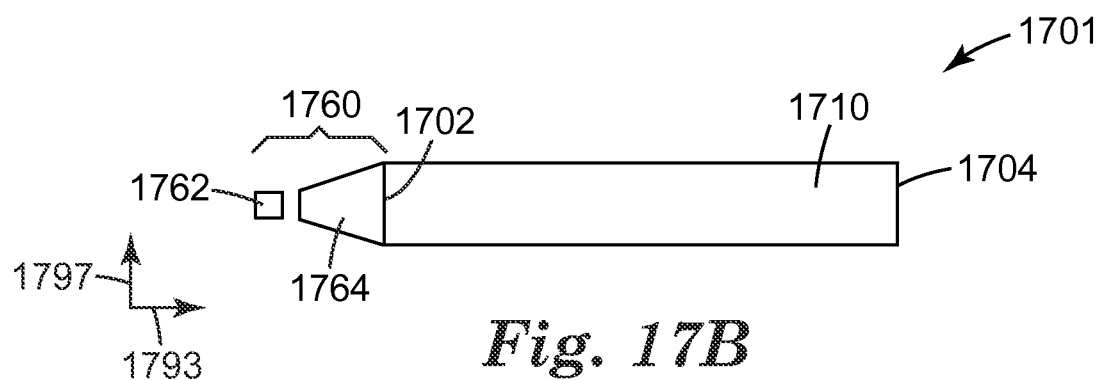
FIG. 17B is a schematic side view of a lighting panel.

An alternative embodiment is shown in FIGS. 17A-17B, which shows lighting panel 1701 including light guide 1710 having input edge 1702 and opposing edge 1704 and light source 1760. Lighting panel 1701 may be a backlight or a front light. Light source 1760 is disposed to inject light into input edge 1702. Light source 1760 includes light emitting components 1762 and light collimating elements 1764. The light guide 1710 has a propagation direction 1793 from input edge 1702 to opposing edge 1704, a width direction 1796 (in-plane direction orthogonal to propagation direction 1793), and a height direction 1797. In the embodiment illustrated in FIGS. 17A-17B, light collimating elements are linear tapers that taper in both the width direction 1796 as shown in FIG. 17A and in the height direction 1797 as shown in FIG. 17B. Light emitting components 1762 may be a plurality of light emitting diodes. The light collimating elements 1764 may have an aspect ratio of 2:1 or higher, for example 3:1. The light collimating elements 1764 may be attached to the light guide 1710 or may be separate.

As used herein, light from a first light source is said to be at least partially collimated in two directions if the amount of light having a polar angle of greater than 30 degrees relative to a propagation direction is less than the amount of light having a polar angle of greater than 30 degrees relative to the propagation direction when the light source is replaced by a Lambertian light source having the same intensity and position as the first light source. Light may be partially collimated in two directions by passing the light through collimating elements 1764, which are tapered in two directions and may have an aspect ratio of 2:1 or higher.

Light sources that can be used in the present description may include light emitting diodes (LEDs). "Light emitting diode" or "LED" refers to a diode that emits light, whether visible, ultraviolet, or infrared, where the emitted light will have a peak wavelength in a range from about 430 to 700 nm. The term LED includes incoherent light sources that are encased or encapsulated semiconductor devices marketed as "LEDs", whether of the conventional or super radiant variety, as well as coherent semiconductor devices such as laser diodes, including but not limited to vertical cavity surface emitting lasers (VCSELs). An "LED die" is an LED in its most basic form, i.e., in the form of an individual component or chip made by semiconductor processing procedures. For example, the LED die may be formed from a combination of one or more Group III elements and of one or more Group V elements (III-V semiconductor). Examples of suitable III-V semiconductor materials include nitrides, such as gallium nitride, and phosphides, such as indium gallium phosphide. Other types of III-V materials can also be used, as well as materials from other groups of the periodic table. The component or chip can include electrical contacts suitable for application of power to energize the device. Examples include wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. Some packaged LEDs are made by forming a polymer encapsulant over an LED die and an associated reflector cup. The LED may be grown on one of several substrates. For example, GaN LEDs may be grown by epitaxy on sapphire, silicon, and gallium nitride. LEDs used with the present description may include high powered GaN LEDs having GaN substrates such as those available from Soraa, Inc., Fremont, Calif. An "LED" for purposes of this description should also be considered to include organic light emitting diodes, commonly referred to as OLEDs.

Examples of collimated light sources suitable for use in the present description are provided by the anamorphic light sources described in PCT Publication WO 2013/122728 (Ouderkirk et al.) and PCT Application No. U.S. 2013/073305, filed Dec. 5, 2013 and entitled "Anamorphic Optical Package", both of which are hereby incorporated herein by reference in their entirety. An example of an anamorphic light source suitable for use in the present description is illustrated in FIGS. 12A and 12B. FIG. 12A shows an isometric view of an exemplary optical package 1200. FIG. 12B shows an exploded view of optical package 1200. Optical package 1200 includes a light emitting component 1210, a converter unit 1205, and a housing 1290. Light emitting component 1210 provides a source of light for the optical package 1200. Converter unit 1205 includes an anamorphic light guide 1220 that guides the light from light emitting component 1210 into a diverter/concentrator element 1260. The diverter/concentrator element 1260 includes a diverter portion 1250 which receives and diverts segments of the light guided by the anamorphic light guide 1220 into a coupling portion 1270. Light is further directed through the coupling portion 1270 into a concentrator portion 1280 of the diverter/concentrator element 1260. The optical package 1200 efficiently couples light from the light emitting component and provides output light with a larger aspect ratio that can be optionally partially collimated in at least one direction. In addition, the effective height of the output light is substantially lower than the effective height of the light emitted from the light emitting component. In the embodiment shown in FIGS. 12A and 12B, diverter portion 1250 is an array of diverter elements (diverter array).

Optical package 1200 includes converter unit 1205 which converts light emitted from light emitting component 1210, which has a first aspect ratio of less than about 10:1, such as about 1:1 to about 1:2, into an output light beam having a second aspect ratio that is larger than the first aspect ratio. For example, the second aspect ratio may be at least twice (or four times or five times) that of the light emitting component. In some embodiments, concentrator portion 1280 outputs light having an aspect ratio of at least 20:1 or greater. In some embodiments, converter unit 1205 produces a line-shaped output beam. The output beam may be substantially collimated in at least one direction and, in some embodiments, can be substantially collimated in two directions. The output light from converter unit 1205 has a lower effective height (beam physical height×full-width-half-maximum angle of the light emitted parallel to the height axis) than the effective height of the light output from light emitting component 1210.

Optical package 1200 can be made using the techniques described in PCT Publication WO 2013/122728. In some embodiments, a unitary construction of converter unit components can be formed using compression or compression-injection molding for diverter portion 1250 and anamorphic light guide 1220.

Figure 13:
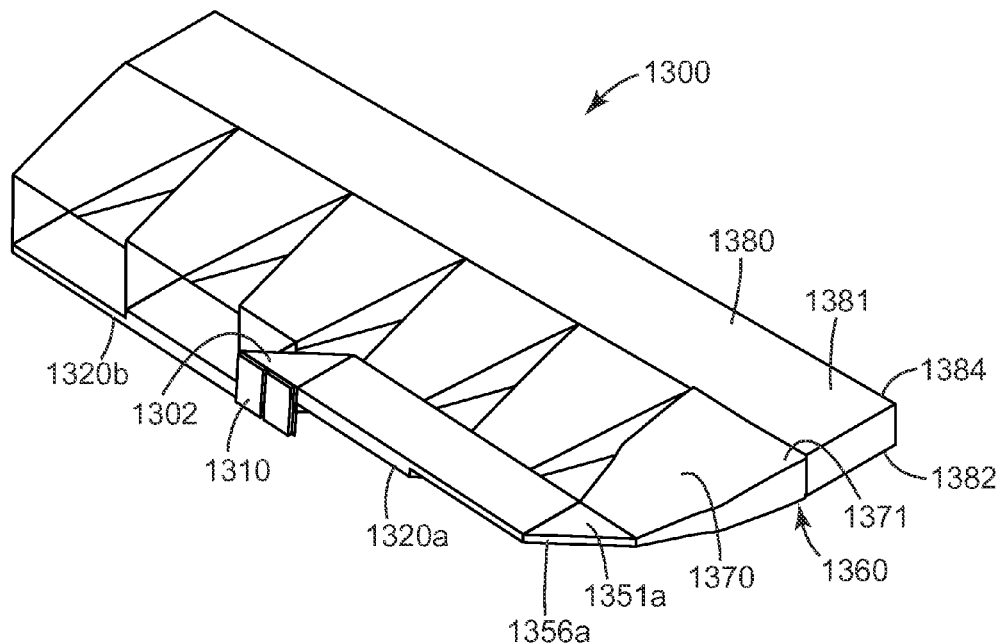
FIG. 13 is an isometric view of a light source.

Coupling portion 1270 receives light exiting the diverting portion 1250. Coupling portion 1270 comprises a series of bodies expanding in one or more dimensions, e.g., trapezoidally-shaped coupling or coupler bodies. The bodies can have a generally planar shape or the coupler bodies can have a tapered shape, such as shown in FIG. 13. In some alternative aspects, the taper may be linear or the taper may be non-linear in at least one axis. A suitable non-linear profile may include a parabola. The taper feature helps capture light that passes directly through the diverter portion (without being diverted by the reflecting surface). In addition, the taper design of the coupling portion collimates the light that passes directly through the diverter portion. Light is guided within coupling portion 1270 via TIR. Thus, coupling portion 1270 can collimate the light in the plane of the coupling portion (i.e., in the plane parallel to the major surfaces of the coupling portion).

FIG. 13 shows another exemplary optical package 1300 that can be used by itself or as a module in combination with other similar optical package modules to illuminate a display or other device. Optical package 1300 includes a light emitting component 1310 and a converter unit that includes an anamorphic light guide and diverter/concentrator unit 1360 having a series of diverters, including diverter 1351a, a coupling portion 1370 and a concentrator portion 1380. A housing is omitted from the figure for simplicity. Light emitting component 1310 provides a source of light for the optical package 1300 and is disposed at a central location along the anamorphic light guide. In this aspect, light emitting component 1310 includes two LEDs. In this aspect, the anamorphic light guide is divided into two parts (or smaller light guides) 1320a and 1320b disposed on either side of the light emitting component 1310. In this arrangement, a first reflective surface 1302, which can be formed on a right angle prism or a surface of the housing (not shown), is provided to reflect at least a portion of the light emitted from the light emitting component 1310 into the anamorphic light guide 1320*a*. A second reflective surface (not shown) can be disposed underneath first reflective surface 1302, to reflect another portion of the light emitted from light emitting component 1310 into anamorphic light guide 1320*b*. The anamorphic light guides 1320*a*, 1320*b* guide the light from light emitting component 1310 into a diverter/concentrator element 1360.

In this aspect, the anamorphic light guide 1320*a*, 1320*b* has a shorter length than anamorphic light guide 1220, although the general design and structure is the same as described above. The diverter/concentrator element 1360 includes a diverter portion which receives and diverts segments of the light guided by the anamorphic light guide 1320*a*, 1320*b* into a coupling portion 1370. In this aspect, the diverter portion includes six diverters (only diverter 1351*a* is shown), each having a reflecting face 1356 (e.g., face 1356*a* is shown in FIG. 13) that changes the light direction by approximately 90°, and guides light into a coupling section 1370 of the diverter/concentrator 1360. In this aspect, the diverter portion includes a gap between adjacent diverters. This diverter spacing can provide more straightforward construction of the optical package in that this configuration provides more room for the coupling bodies at the output faces of the diverters.

Light is further directed through the coupling portion 1370 into a concentrator portion 1380 of the diverter/concentrator element 1360. Coupling portion 1370 comprises a series of coupling bodies expanding in one or more dimensions, e.g., trapezoidally-shaped bodies (such as coupling body 1371). In this aspect, the bodies include tapers in multiple directions, as the taper linearly expands horizontally (in plane) and parabolically expands vertically (normal to the plane of the diverter bodies) towards the concentrator 1380. This taper feature helps capture light that passes directly through the diverter portion (without being diverted by the reflecting surface). Light is guided within coupling portion 1370 via TIR. In this particular aspect, an air gap may or may not exist between the exit face of the diverter portion and the input face of the coupling portion.

Light exiting coupling portion 1370 enters concentrator portion 1380. In this aspect, concentrator 1380 comprises a rectilinear body having no taper, such that concentrator major surfaces 1381 and 1382 are generally parallel with each other and generally perpendicular to output surface 1384. The concentrator 1380 may be made from a continuous molded article using the construction materials described above. With this configuration, the center of the light emitting component 1310 is aligned or coincident with the center of the concentrator 1380 in height, thus allowing for a reduced overall package size.

In embodiments where substantially collimated light is input into the light guide, the multiplets may be doublets. In embodiments where substantially Lambertian light is input into the light guide, the multiplets may be triplets. It has been found that triplets may be more effective than doublets in extracting Lambertian light from the light guide.

The multiplet extractors can preserve or improve the collimation of the source light. In some embodiments, light from the light guide illuminates an LCD panel and when the light exits the LCD panel it has a half-angle width at half-maximum power relative to at least one axis of the display of no more than about 35 degrees, or no more than about 30 degrees, or no more than about 25 degrees. In some embodiments, light from the light guide illuminates an LCD panel and when the light exits the LCD panel it has a half-angle width at half-maximum power relative to both axes of the display of no more than about 35 degrees, or no more than about 30 degrees, or no more than about 25 degrees.

The efficiency of a display may be defined as the amount of light extracted from the display divided by the amount of light launched into the light guide of the lighting panel of the display. In some embodiments of the present description, displays have an efficiency greater than 60 percent or greater than 70 percent.

As used herein, layers, components, or elements are described as being adjacent one another. Layers, components, or elements can be adjacent one another by being in direct contact, by being connected through one or more other components, or by being held next to one another or attached to one another. Layers, components, or elements that are in direct contact are described as being immediately adjacent.

Unless otherwise indicated, all numbers expressing feature sizes, amounts, and physical properties used in the specification and claims are to be understood as being modified in all instances by the term "about."

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

EXAMPLES

Example 1

A light guide having doublet extractors was modeled using standard ray tracing software. The doublets had the geometry shown in FIGS. 3A-3B and were varied in length and spacing to give an extractor density that produced a nearly uniform light output intensity over the area of the light guide. This extractor density varied from about 1 percent at the input edge to about 14 percent at the opposing edge. All extraction features were 10.9 microns high and the reflecting faces (e.g., first surface 366*a*) of the extraction features were curved with a radius of curvature of 48.5 microns and had an average slope of 45 degrees (or referring to FIG. 1, the average value of first angle 142*a* was 45 degrees). The near vertical face of the extraction features (e.g., second surface 368*a*) had a slope of 5 degrees from vertical (or referring to FIG. 1, second angle 144*a* was 95 degrees). The light guide dimensions were 150 mm from the input edge to the opposing edge, which was the vertical direction of a display, 200 mm in the orthogonal in-plane direction, which was the horizontal direction of the display, and 500 microns in thickness.

The light guide was modeled as a clear polymer having a refractive index of 1.53. A reflective polarizer was included above the light guide with an air gap between the light guide and the reflective polarizer. An absorbing polarizer was attached to the reflective polarizer opposite the light guide.

A specular depolarizing reflector having a reflectivity of 0.95 was included below the light guide with an air gap between the light guide and the reflector.

Figure 16:
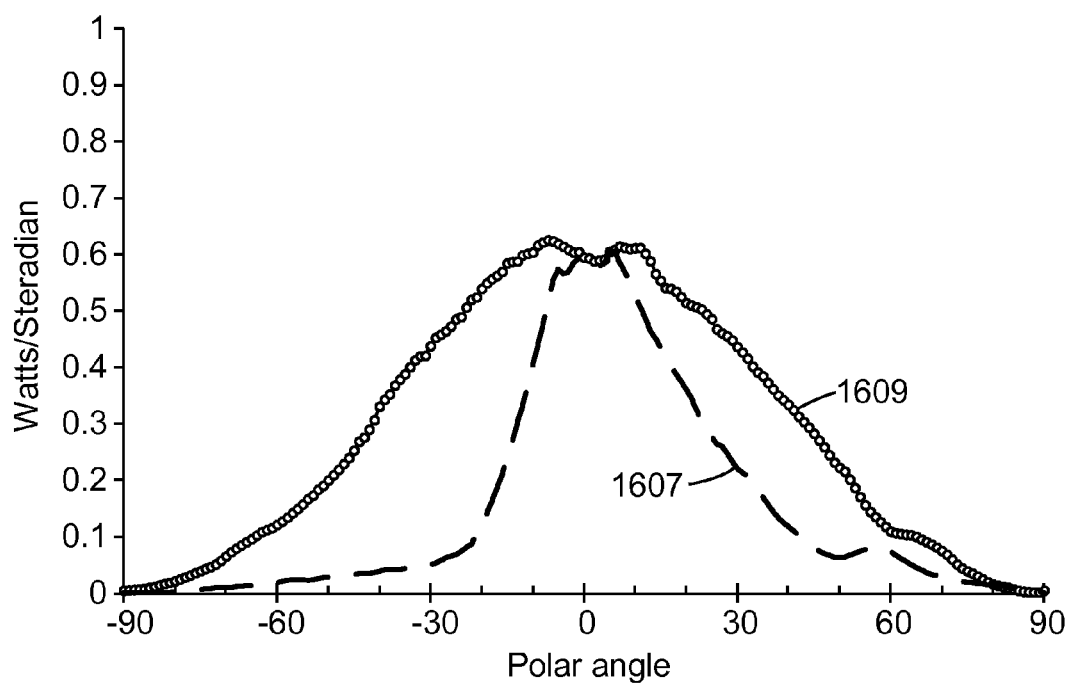
FIG. 16 is a graph of the angular distribution of light output from a display.

A uniform Lambertian light input distribution was assumed along the 200 mm input edge of the light guide having a total power of 1 Watt. The output as a function of view angle is shown in FIG. 16. Curve 1607 gives the output in Watts/steradian for view angles along the vertical direction of the display and curve 1609 gives the output in Watts/steradian for view angles along the horizontal direction of the display. The output showed a substantial degree of collimation in the vertical direction and a near Lambertian output distribution in the horizontal direction.

Example 2

Figure 14:
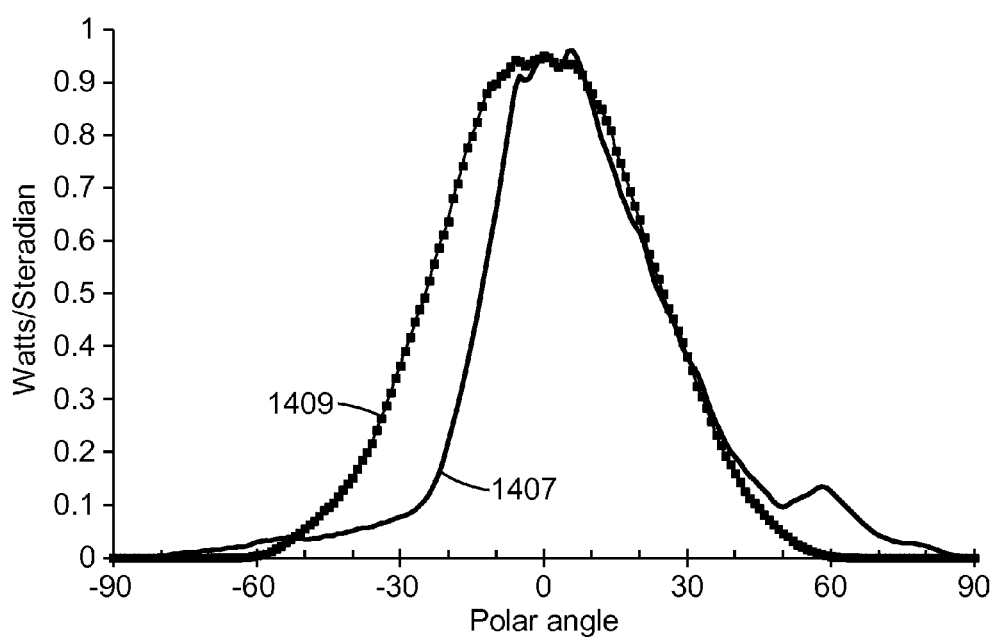
FIG. 14 is a graph of the angular distribution of light output from a display.

A system was simulated as in Example 1, except that the light source was replaced with a system similar to the system shown in FIGS. 11A-11B. The input tapers were taken to be linear wedges with input faces 1 mm in width and output faces 2 mm in width. This geometry defined the wedge sides as having total angular separations (1199 in FIG. 11A) of 14 degrees. The output as a function of view angle is shown in FIG. 14. Curve 1407 gives the output in Watts/steradian for view angles along the vertical direction of the display and curve 1409 gives the output in Watts/steradian for view angles along the horizontal direction of the display. The output showed a substantial degree of collimation in both the vertical and horizontal directions.

Example 3

Figure 15:
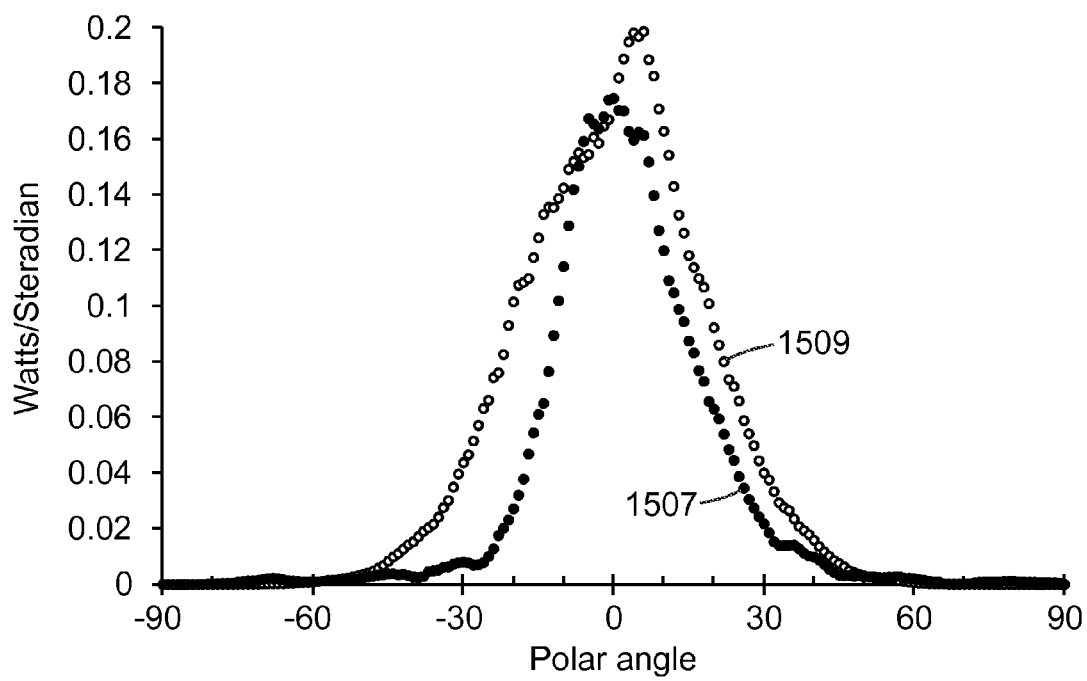
FIG. 15 is a graph of the angular distribution of light output from a display.

A system was simulated as in Example 1, except that the light source was replaced with the light source shown in FIGS. 12A-12B. The output as a function of view angle is shown in FIG. 15. Curve 1507 gives the output in Watts/steradian for view angles along the vertical direction of the display and curve 1509 gives the output in Watts/steradian for view angles along the horizontal direction of the display. The output showed a substantial degree of collimation in both the vertical and horizontal directions. Efficiency for the system was determined to be 72%, where the efficiency is defined as the amount of extracted light divided by the light launched into the light guide. In contrast, typical efficiencies for conventional systems using Lambertian light sources and BEF films for recycling range from about 40%-50% depending on the system.

Descriptions for elements in figures should be understood to apply equally to corresponding elements in other figures, unless indicated otherwise. The present invention should not be considered limited to the particular embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:
1. A light guide comprising:
a first major surface, a second major surface, an input edge and an opposing edge, at least one of the first major surface and the second major surface including a plurality of multiplets, each multiplet including two or more extraction features, each extraction feature having an indented geometry with no portion of the extraction feature extending outwardly from the light guide beyond the major surface including the extraction feature,
wherein at least one extraction feature has a maximum length, the maximum length being along a first direction parallel to the major surface including the at least one extraction feature, the first direction at an angle from about 45 degrees to about 90 degrees from a second direction from the input edge to the opposing edge, the at least one extraction feature including a first tapered region extending along the first direction and having a height that is tapered along the first direction, the at least one extraction feature having a first surface facing the input edge and a second surface facing the opposing edge, the first surface having a smoothly curved shape that curves away from the input edge.

2. The light guide of claim 1, wherein each multiplet includes two or three extraction features.

3. The light guide of claim 1, wherein each extraction feature has an asymmetric shape.

4. The light guide of claim 3, wherein the first surface has a first slope, the second surface has a second slope, wherein a magnitude of the first slope is lower than a magnitude of the second slope.

5. The light guide of claim 1, wherein the at least one extraction feature includes a central region having a height that does not vary along the first direction and having a first length along the first direction, and wherein the first tapered region has a second length along the first direction smaller than the first length.

6. The light guide of claim 1, wherein the at least one extraction feature includes a central region having a height that does not vary along the first direction and having a first nonzero length along the first direction, and wherein the first tapered region has a second length larger than the first length.

7. The light guide of claim 1, wherein the at least one extraction feature includes a first central region having a first length along the first direction and the first tapered region has a second length smaller that the first length, and the at least one extraction feature includes a second central region having a third length along the first direction and a second tapered region having a fourth length along the first direction larger than the third length, the second tapered region having a height that is tapered along the first direction, each of the first and second central regions having a height that does not vary along the first direction.

8. The light guide of claim 1, wherein the plurality of multiplets include a spacing between adjacent multiplets that decreases from the input edge to the opposing edge.

9. The light guide of claim 1, wherein a length of the extraction features increases from the input edge to the opposing edge.

10. A lighting panel comprising: the light guide of claim 1, and a light source configured to inject light into the input edge of the light guide.

11. The lighting panel of claim 10, wherein the light source injects substantially Lambertian light from air into the light guide.

12. The lighting panel of claim 10, wherein the light source injects light that is at least partially collimated in at least one direction into the light guide.

13. The lighting panel of claim 12, wherein the light source injects light that is at least partially collimated in two directions into the light guide.

14. The lighting panel of claim 10, wherein light output into air from the lighting panel is collimated such that it has a half-angle width at half-maximum power relative to at least one axis of the lighting panel of no more than about 30 degrees.

15. The lighting panel of claim 10, wherein the light source includes:
   a light emitting component that emits light having a first aspect ratio; and
   a converter unit that includes an anamorphic light guide to receive the light from the light emitting component, a diverter array to receive and divert light from the anamorphic light guide, and a concentrator to collect light received from the diverter array, wherein the concentrator outputs light having a second aspect ratio, the second aspect ratio being greater than the first aspect ratio, and wherein an effective height of the output light from the concentrator is lower than an effective height of the light emitted by the light emitting component.

16. The lighting panel of claim 10, wherein the light source includes a plurality of LEDs disposed to inject LED light into collimating structures, the collimating structures disposed to direct the LED light into the input edge of the light guide.

17. A display comprising the lighting panel of claim 10.

18. The display of claim 17, further comprising an LCD panel disposed proximate the first major surface of the light guide, and a reflective polarizer disposed between the LCD panel and the light guide.

19. The display of claim 18, further comprising a reflector disposed proximate the light guide opposite the LCD panel.

20. The light guide of claim 1, wherein the at least one extraction feature further comprises:
   a central region extending along the first direction and having a height that does not vary along the first direction; and
   a second tapered region extending along the first direction and having a height that is tapered along the first direction,
   wherein the central region is disposed between the first and second tapered regions.

21. The light guide of claim 1, wherein the at least one extraction feature includes a first extraction feature and a second extraction feature, the first extraction feature disposed closer to the input edge than the second extraction feature, each of the first and second extraction features having a central region extending along the first direction and having a height that does not vary along the first direction, the central region of the first extraction feature having a smaller length along the first direction than the central region of the second extraction feature.

22. The light guide of claim 1, when an angle formed between the first surface and the major surface including the at least one extraction feature is in a range of 120 to 130 degrees at a first location on the first surface proximate the major surface including the extraction feature and is in a range of 135 to 145 degrees at a second location on the first surface proximate an apex of the extraction feature.

* * * * *